(12) United States Patent
Tóth

(10) Patent No.: US 12,384,455 B2
(45) Date of Patent: Aug. 12, 2025

(54) ELECTROMECHANICAL STEERING SYSTEM AND METHOD FOR COMPENSATING A MEASUREMENT SIGNAL FROM A TORQUE SENSOR DEVICE

(71) Applicants: thyssenkrupp Presta AG, Eschen (LI); thyssenkrupp AG, Essen (DE)

(72) Inventor: Tivadar Kristóf Tóth, Budapest (HU)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 328 days.

(21) Appl. No.: 18/029,021

(22) PCT Filed: Sep. 24, 2021

(86) PCT No.: PCT/EP2021/076301
§ 371 (c)(1),
(2) Date: Mar. 28, 2023

(87) PCT Pub. No.: WO2022/069354
PCT Pub. Date: Apr. 7, 2022

(65) Prior Publication Data
US 2023/0365190 A1    Nov. 16, 2023

(30) Foreign Application Priority Data
Sep. 30, 2020 (DE) .................... 10 2020 212 378.0

(51) Int. Cl.
*B62D 6/10* (2006.01)
*G01L 3/10* (2006.01)
*G01L 5/22* (2006.01)

(52) U.S. Cl.
CPC ............... *B62D 6/10* (2013.01); *G01L 3/104* (2013.01); *G01L 5/221* (2013.01)

(58) Field of Classification Search
CPC .......... B62D 6/10; G01L 3/104; G01L 5/221; G01L 3/101
See application file for complete search history.

(56) References Cited

U.S. PATENT DOCUMENTS 5,668,722 A * 9/1997 Kaufmann ........... B62D 5/0466
                                                    701/41
6,122,579 A * 9/2000 Collier-Hallman ........................
                                                  B62D 5/0472
                                                      318/432
(Continued)

FOREIGN PATENT DOCUMENTS

CN     109756169 A  *  5/2019 ............. B62D 5/046
DE     199 55 475 A1    6/2001
(Continued)

OTHER PUBLICATIONS

English Translation of International Search Report issued in PCT/EP2021/076301, dated Dec. 16, 2021.

*Primary Examiner* — Octavia Hollington
(74) *Attorney, Agent, or Firm* — thyssenkrupp North America, LLC

(57) ABSTRACT

An electromechanical steering system includes a steering shaft by which a steering command can be specified by a steering handling device, and a steering gear, which is designed to convert a steering command into a steering movement of steerable wheels of a motor vehicle, taking into account at least one input variable. A magnetic torque sensor device measures a torque applied to the steering shaft. The torque sensor device comprises a sensor for detecting an uncompensated measurement signal (T). The torque sensor device comprises a computing unit, which is designed to provide a first parameter and a second parameter for compensation of the uncompensated measurement signal (T) and to calculate a compensated measurement signal (T*) based (Continued)

on the uncompensated measurement signal (T) and the two parameters and to provide this compensated measurement signal (T) as the at least one input variable.

12 Claims, 5 Drawing Sheets

(56) References Cited

U.S. PATENT DOCUMENTS

| | | | |
|---|---|---|---|
| 6,381,525 B1 | 4/2002 | Hori et al. | |
| 6,658,335 B2 * | 12/2003 | Kleinau | B62D 5/0466 318/434 |
| 6,965,820 B2 * | 11/2005 | Amberkar | B62D 5/0472 180/443 |
| 9,031,747 B2 * | 5/2015 | Benyo | B62D 5/0463 701/42 |
| 9,109,965 B2 | 8/2015 | Lee et al. | |
| 9,435,708 B1 | 9/2016 | Kari | |
| 9,789,905 B2 * | 10/2017 | Matsuno | G05D 1/0278 |
| 10,236,812 B2 * | 3/2019 | Gémesi | B62D 5/046 |
| 11,262,259 B2 * | 3/2022 | Park | G01L 3/104 |
| 2005/0228564 A1 * | 10/2005 | Kato | B62D 6/008 701/91 |
| 2013/0305843 A1 | 11/2013 | Lee et al. | |
| 2014/0076654 A1 | 3/2014 | Yoshida et al. | |
| 2020/0264062 A1 | 8/2020 | Park | |

FOREIGN PATENT DOCUMENTS

| | | |
|---|---|---|
| DE | 100 37 692 A1 | 7/2001 |
| DE | 10 2013 008 204 A1 | 3/2014 |
| DE | 102015117504 A1 * | 4/2017 |
| EP | 2 664 906 A2 | 11/2013 |
| KR | 20140026171 A * | 3/2014 |
| WO | 2017/115922 A1 | 7/2017 |

* cited by examiner

ELECTROMECHANICAL STEERING SYSTEM AND METHOD FOR COMPENSATING A MEASUREMENT SIGNAL FROM A TORQUE SENSOR DEVICE

CROSS REFERENCE TO RELATED APPLICATIONS

This application is a U.S. National Stage Entry of International Patent Application Serial Number PCT/EP2021/076301, filed Sep. 24, 2021, which claims priority to German Patent Application No. DE 10 2020 212 378.0, filed Sep. 30, 2020, the entire contents of which are incorporated herein by reference.

FIELD

The present disclosure generally relates to an electromechanical steering system comprising a steering shaft by means of which a steering command can be specified by means of a steering handling device.

BACKGROUND

A magnetic torque sensor device for an electromechanical steering system of a motor vehicle may be formed using the so-called moving magnet technology. In this case, the torque introduced into an input shaft by the motor vehicle driver by means of a steering handling device, in particular a steering wheel, also referred to as steering torque, is measured by detecting the magnetic field generated by a magnetic ring non-rotatably connected to the input shaft. The torque is determined as a function of a detected angle of rotation, also referred to as the steering angle of rotation or differential angle. Since this is a non-contact or contactless detection of the torque, i.e. the components moving relative to each other do not contact each other mechanically, the torque sensor device is wear-free and thus practically maintenance-free and thus in turn cost-efficient in terms of operating costs. Therefore, it is particularly suitable for use in automotive technology.

Such magnetic torque sensor devices are known from the prior art, for example from EP 2 664 906 A2 and WO 2017/115922 A1.

However, it is problematic that the measurement signal of the torque sensor device has signal artifacts that reduce the quality of the measurement result and thus limit the application possibilities of the torque sensor device. These signal artifacts include, in particular, nonlinearities and asymmetries. Electromechanical steering systems which receive input variables for steering the wheels provided by such torque sensor devices work with certain inaccuracies in this respect.

Thus a need exists to provide an improved electromechanical steering system, which in particular enables a more precise implementation of steering commands at the wheels to be steered of a motor vehicle. Furthermore, a method is to be provided to improve the quality of the measurement result of the generic torque sensor device and thus to make the generic torque sensor device more versatile.

DETAILED DESCRIPTION

Figure 1:
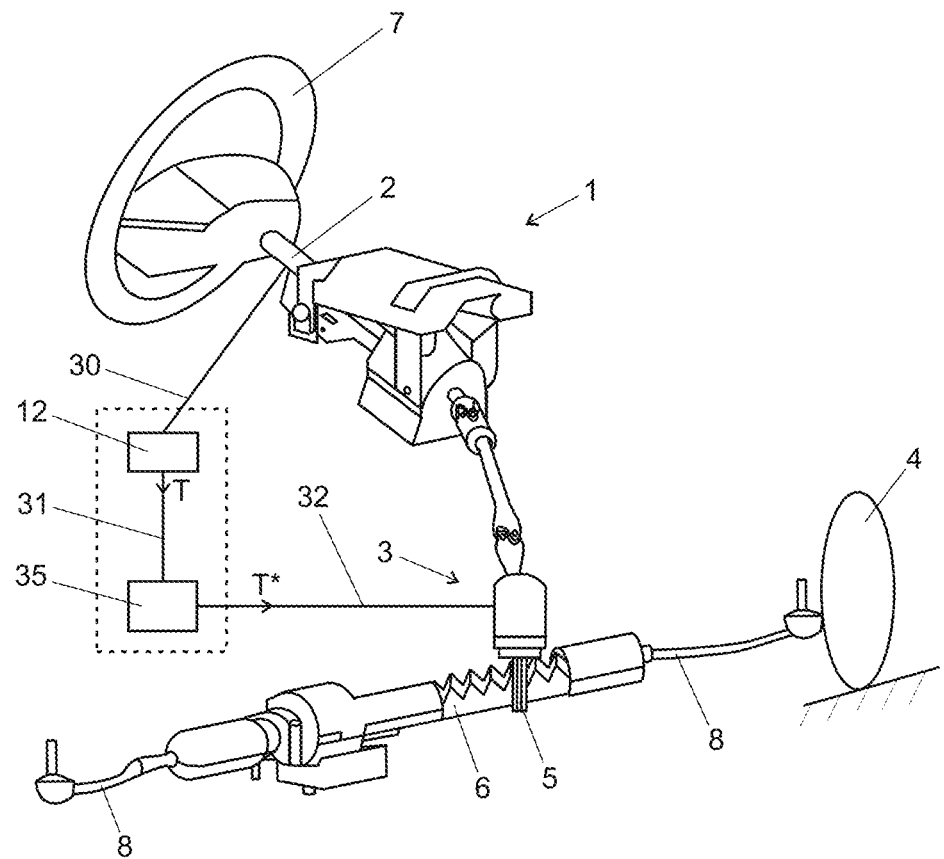
FIG. 1 is a perspective, schematic an exemplary embodiment of an electromechanical steering system designed according to the invention of a motor vehicle.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to an electromechanical steering system comprising a steering shaft by means of which a steering command can be specified by means of a steering handling device, a steering gear which is designed to convert a steering command into a steering movement of steerable wheels of a motor vehicle, taking into account at least one input variable, and a magnetic torque sensor device for measuring a torque applied to the steering shaft, wherein the rotary sensor device has a sensor for detecting an uncompensated measurement signal. Furthermore, the invention relates to a method for compensation of a measurement signal of a torque sensor device for an electromechanical steering system of a motor vehicle.

The proposed electromechanical steering system comprises a steering shaft by means of which a steering command can be specified by means of a steering handling device, a steering gear designed to convert a steering command into a steering motion of steerable wheels of a motor vehicle, taking into account at least one input variable, and a magnetic torque sensor device for measuring a torque applied to the steering shaft. The torque sensor device comprises a sensor for detecting an uncompensated measurement signal, wherein the torque sensor device is assigned a computing unit which is designed to provide a first parameter and a second parameter for compensation of the uncompensated measurement signal and to calculate a compensated measurement signal based on the uncompensated measurement signal and the first parameter and the second parameter and to provide it as the at least one input variable. In particular, signal artifacts are compensated. Advantageously, steering commands can be implemented more precisely with the proposed steering system. The driving experience is also improved for the driver of a motor vehicle by this. Driving safety, especially with regard to autonomous driving, can also advantageously be increased as a result.

In particular, it is provided that the torque sensor device comprises the computing unit. However, it is also provided in particular that the computing unit may be part of a central control unit of a motor vehicle, wherein the computing unit can advantageously be connected to the torque sensor device via an interface, and the computing unit is assigned to the torque sensor device in this manner. Furthermore, it is provided in particular that the computing unit is designed to provide the compensated measurement signal as an input variable to a steering controller, in particular a steering gear.

According to a particularly advantageous embodiment of the invention, it is provided that the steering shaft comprises an input shaft that can be non-rotatably connected to a steering handling device and an output shaft connected to the input shaft via a torsion bar that can be twisted. Advantageously, the torque sensor device further comprises a multi-pole magnetic ring non-rotatably connected to the input shaft for generating a magnetic field, a stator ring element non-rotatably connected to the output shaft and enclosing the magnetic ring and a magnetic flux collector. The sensor of the torque sensor device is advantageously designed to detect the uncompensated measurement signal based on the magnetic field applied to the magnetic flux collector. Advantageously, the sensor is a magnetic sensor, especially a Hall sensor. In particular, it is provided that the sensor is stationary relative to the steering shaft, and the position of the sensor does not change when the steering shaft rotates. Advantageously, this embodiment is particularly robust against interference influences, such as contamination, whereby the quality of the measurement signal and thus ultimately the steering behavior of the steering system is further improved.

Further advantageously, the computing unit is designed to provide the first parameter as a linearization parameter for compensation of nonlinear behavior. The compensation of nonlinear behavior advantageously further improves the quality of the measurement signal and thus ultimately the steering behavior of the steering system. Preferably, the linearization parameter is a design-specific parameter. Advantageously, the linearization parameter takes into account or models in particular the geometric shape of the magnetic ring and/or the number of magnetic poles of the magnetic ring. Furthermore, it is provided in particular that the linearization parameter is a third-order polynomial parameter, wherein the linearization parameter is advantageously used for S-curve compensation.

Further advantageously, the computing unit is designed to provide the second parameter as a symmetrization parameter for compensation of asymmetrical behavior of the uncompensated measurement signal. Advantageously, in particular measurement inaccuracies due to tolerances or asymmetries in the manufacture of the individual components of the torque sensor device and/or due to tolerances or asymmetries in the assembly of the individual components, in particular in the assembly or arrangement of the magnetic ring relative to the stator ring element of the torque sensor device, are counteracted by this. The symmetrization parameter is preferably a component-specific parameter. In particular, it is provided that the symmetrization parameter is a second-order polynomial parameter.

A further particularly advantageous embodiment of the invention provides that the computing unit is designed to calculate the compensated measurement signal according to the following calculation formula:

$$T^* = T + T^2 * p_{symm} + T^3 * p_{lin};$$

with
$T^*$=compensated measurement signal; T=uncompensated measurement signal;
$p_{symm}$=second parameter; $p_{lin}$=first parameter.

This means that the compensated measurement signal advantageously consists of the sum of the uncompensated measurement signal and the product of the square of the uncompensated measurement signal with the second parameter and the product of the uncompensated measurement signal raised to the power of three and the first parameter.

The calculation according to the aforementioned calculation formula advantageously enables the compensation of asymmetrical behavior by a second order compensation or approximation calculation. This is an efficient and automatable way to compensate for or to balance out asymmetrical behavior in the uncompensated measurement signal.

The further proposed method for achieving the aforementioned object for compensation of a measurement signal of a torque sensor device for an electromechanical steering system of a motor vehicle provides for the following steps: generation of an uncompensated measurement signal (T) by the sensor; provision of at least a first parameter and a second parameter for compensation of the uncompensated measurement signal (T); calculation of a compensated measurement signal (T*) based on the uncompensated measurement signal (T) and the first parameter and the second parameter. In particular, it is provided that an input shaft non-rotatably connected to a steering handling device is connected to an output shaft via a torsion bar that can be twisted, and the torque sensor device advantageously comprises a multi-pole magnetic ring non-rotatably connected to the input shaft for generating a magnetic field, a stator ring element non-rotatably connected to the output shaft and enclosing the magnetic ring, a magnetic flux collector, and a for generating a measurement signal. In particular, it is provided that the sensor is also connected to the non-rotating steering system.

The method according to the invention makes it possible to compensate for signal artifacts in the measurement signal of the torque sensor device. This makes it possible to perform a more robust torque detection that is less prone to failure. This expands the application possibilities of the torque sensor device.

The uncompensated measurement signal (T) can also be referred to as the raw signal and the compensated measurement signal (T*) can also be referred to as the processed signal. The uncompensated and the compensated measurement signal can each be a corresponding torque signal.

Advantageously, the provision of the first parameter includes the following step: providing a linearization parameter (p_lin) for compensation of nonlinear behavior of the uncompensated measurement signal (T). The nonlinear behavior or the nonlinearity of the uncompensated measurement signal is caused in particular by the entire structure of the magnetic circuit. These are therefore design-related signal artifacts. Due to the structure of the magnetic circuit and the measuring principle, the nonlinear behavior of the uncompensated measurement signal cannot be avoided. The compensation of nonlinear behavior advantageously improves the quality of the measurement result of the torque sensor device.

In a further advantageous manner, the linearization parameter (p_lin) is a design-specific parameter. The linearization parameter (p_lin) takes into account or models in particular the geometric shape of the magnetic ring and/or the number of magnetic poles of the magnetic ring. In particular, it is provided that the linearization parameter (p_lin) is a third-order polynomial parameter. The linearization parameter (p_lin) is advantageously used for S-curve compensation.

It is preferred that the provision of the second parameter includes the following step: providing a symmetrization parameter (p_symm) for compensation of asymmetrical behavior of the uncompensated measurement signal (T). The asymmetrical behavior or the asymmetry of the uncompensated measurement signal is causally based in particular on tolerances or asymmetries in the manufacture of the individual components of the torque sensor device and/or on tolerances or asymmetries in the assembly of the individual components, in particular in the assembly or arrangement of the magnetic ring relative to the stator ring element, the torque sensor device. Both the manufacturing tolerances and the assembly tolerances cannot be completely avoided in practice. Therefore, the uncompensated measurement signal always has a certain degree of asymmetrical behavior, which reduces the quality of the measurement result. The compensation of nonlinear behavior cannot prevent or compensate for the asymmetrical behavior of the uncompensated measurement signal. The compensation of asymmetrical behavior improves the quality of the measurement result of the torque sensor device according to the invention.

It is further preferred that the symmetrization parameter (p_symm) is a component-specific parameter. The symmetrization parameter (p_symm) advantageously takes into account or models specific features of individual components or elements. Specifically, the symmetrization parameter (p_symm) is a second-order polynomial parameter.

Advantageously, the compensated measurement signal (T*) is calculated using the following calculation formula:

$$T^* = T + T^2 * p_{symm} + T^3 * p_{lin};$$

with

T*=compensated measurement signal; T=uncompensated measurement signal;

$p_{symm}$=second parameter; $p_{lin}$=first parameter.

In particular, it is provided that the second parameter is the symmetrization parameter. Further, it is provided in particular that the first parameter is the linearization parameter.

The calculation formula advantageously enables the compensation of asymmetrical behavior by a second-order compensation or approximation calculation. This is an efficient and automatable way to compensate for or balance out asymmetrical behavior in the uncompensated measurement signal (T).

Further advantageously, the sensor for generating a measurement signal is a magnetic sensor, in particular a Hall sensor.

Furthermore, a torque sensor device for operating the method according to the invention is proposed. In particular, it is provided that the torque sensor device comprises an input shaft non-rotatably connected to a steering handling device, an output shaft connected to the input shaft via a torsion bar that can be twisted, a multi-pole magnetic ring non-rotatably connected to the input shaft for generating a magnetic field, a stator ring element non-rotatably connected to the output shaft and enclosing the magnetic ring, a magnetic flux collector and a sensor for generating a measurement signal. Advantageously, the sensor for generating a measurement signal is a magnetic sensor, in particular a Hall sensor. In particular, it is provided that the sensor can also be connected or is connected to the non-rotating steering system. In particular, the torque sensor device comprises a computing unit. Advantageously, the first parameter and the second parameter are provided by the computing unit. Further advantageously, the computing unit is designed for calculating a compensated measurement signal (T*) based on the uncompensated measurement signal (T) and the first parameter (p_lin) and the second parameter (p_symm), preferably according to the formula, $$T^* = T + T^2 * p_{symm} + T_3 * p_{lin};$$

with

T*=compensated measurement signal; T=uncompensated measurement signal;

$p_{symm}$=second parameter; $p_{lin}$=first parameter.

In the different figures, identical parts are provided with the same reference signs and are therefore usually named or mentioned only once.

FIG. 1 shows an electromechanical steering system 1 in a perspective, simplified representation from diagonally in front in the direction of vehicle travel, wherein non-essential components are not shown for the sake of a better overview for the description of the invention.

The steering system 1 for a motor vehicle comprises a steering column with a steering shaft 2. The steering shaft 2 is mechanically coupled to the steerable wheels 4 of a motor vehicle via a steering gear 3. In this exemplary embodiment, the steering gear 3 comprises a pinion 5 and a toothed coupling rod 6, wherein the steering gear 3 serves to translate a rotational movement of the pinion 5 into a translational movement of the coupling rod 6 along its longitudinal axis. On the end of the steering shaft 2 nearer the driver, a steering handling device 7, in particular a steering wheel, for entering a driver's steering request or steering command is non-rotatably arranged, wherein a driver can turn the steering handling device 7 in the form of a steering wheel in a known manner for entering his steering command. In this exemplary embodiment, the coupling rod 6, which moves linearly along its longitudinal axis, is mechanically coupled to a tie rod 8 on both sides of the motor vehicle. The tie rods 8 are in turn each mechanically coupled to the vehicle wheels 4. The steering gear 3 is thus designed to convert a steering command into a steering movement of the steerable wheels 4 of the motor vehicle, taking into account at least one input variable. The steering system 1 further comprises a torque sensor device 40 shown only schematically in FIG. 1, which comprises a sensor 12 for detecting an uncompensated measurement signal T. The connecting line 30 in FIG. 1 symbolically represents the corresponding arrangement of the sensor 12 on the steering shaft 2, in which the sensor 12 can detect a torque applied to the steering shaft 2. Via a signal line 31, which may be wired or wireless, the detected uncompensated measurement signal T is transmitted to a computing unit 35 assigned to the torque sensor device 40. The computing unit 35 is part of the torque sensor device 40 in this exemplary embodiment. In particular, the computing unit 30 may be a microcontroller circuit, in particular an application-specific integrated circuit (ASIC). The computing unit is designed to provide a first parameter and a second parameter for compensation of the uncompensated measurement signal T and to calculate a compensated measurement signal T* on the basis of the uncompensated measurement signal T and the first parameter and the second parameter, in particular as the sum of the uncompensated measurement signal T and the product of the square of the uncompensated measurement signal T with the second parameter and the product of the uncompensated measurement signal T raised to the power of three and the first parameter. Furthermore, the computing unit 35 is designed to provide the calculated compensated measurement signal T* as an input variable via a signal line 32, which may be wired or wireless, in particular as a radio connection, in particular to the steering gear 3 or to a control unit assigned to the steering gear 3 (not shown in FIG. 1).

Figure 2:
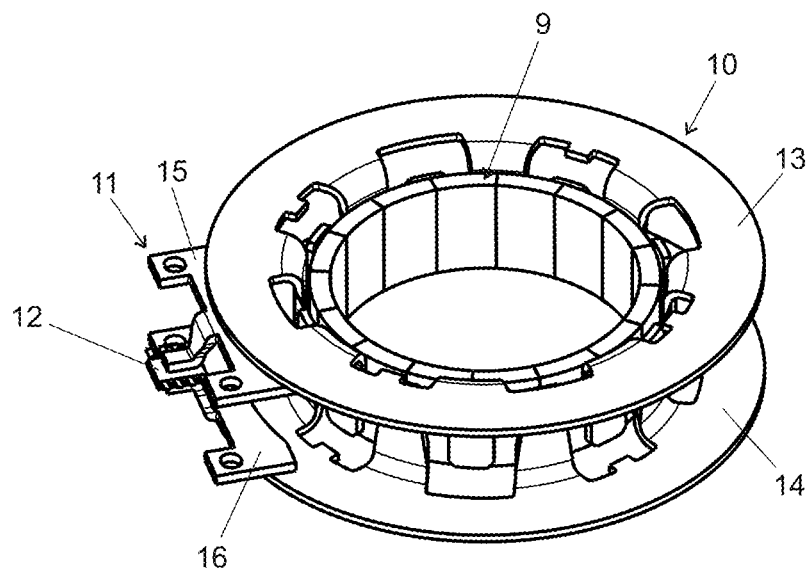
FIG. 2 is a perspective view of an exemplary embodiment of components of a torque sensor device for an electromechanical steering system.

FIG. 2 shows components of a torque sensor device, in particular for a torque sensor device 40 according to FIG. 1, for an electromechanical steering system of a motor vehicle in a perspective representation.

The components comprise a multi-pole magnetic ring 9 for generating a magnetic field to be non-rotatably connected to an input shaft not shown in FIG. 2. The magnetic ring 9 comprises a plurality of individual magnetic poles, wherein individual poles arranged directly next to each other or adjacent each have different poles. The input shaft can be arranged in the central opening of the magnetic ring 9, so that the input shaft and the magnetic ring 9 are arranged coaxially to each other. Furthermore, the components comprise a stator ring element 10 non-rotatably connected to an output shaft that is also not shown in FIG. 2 and radially enclosing the magnetic ring 9, a magnetic flux collector 11, and a sensor 12 for generating a measurement signal.

The stator ring element 10 is formed in two parts and comprises a first stator sub-ring element 13 and a second stator sub-ring element 14. The magnetic flux collector 11 is also formed in two parts and comprises a first magnetic flux sub-collector 15 and a second magnetic flux sub-collector 16. The sensor 12 is a Hall sensor, preferably in a dual-die package.

Figure 3:
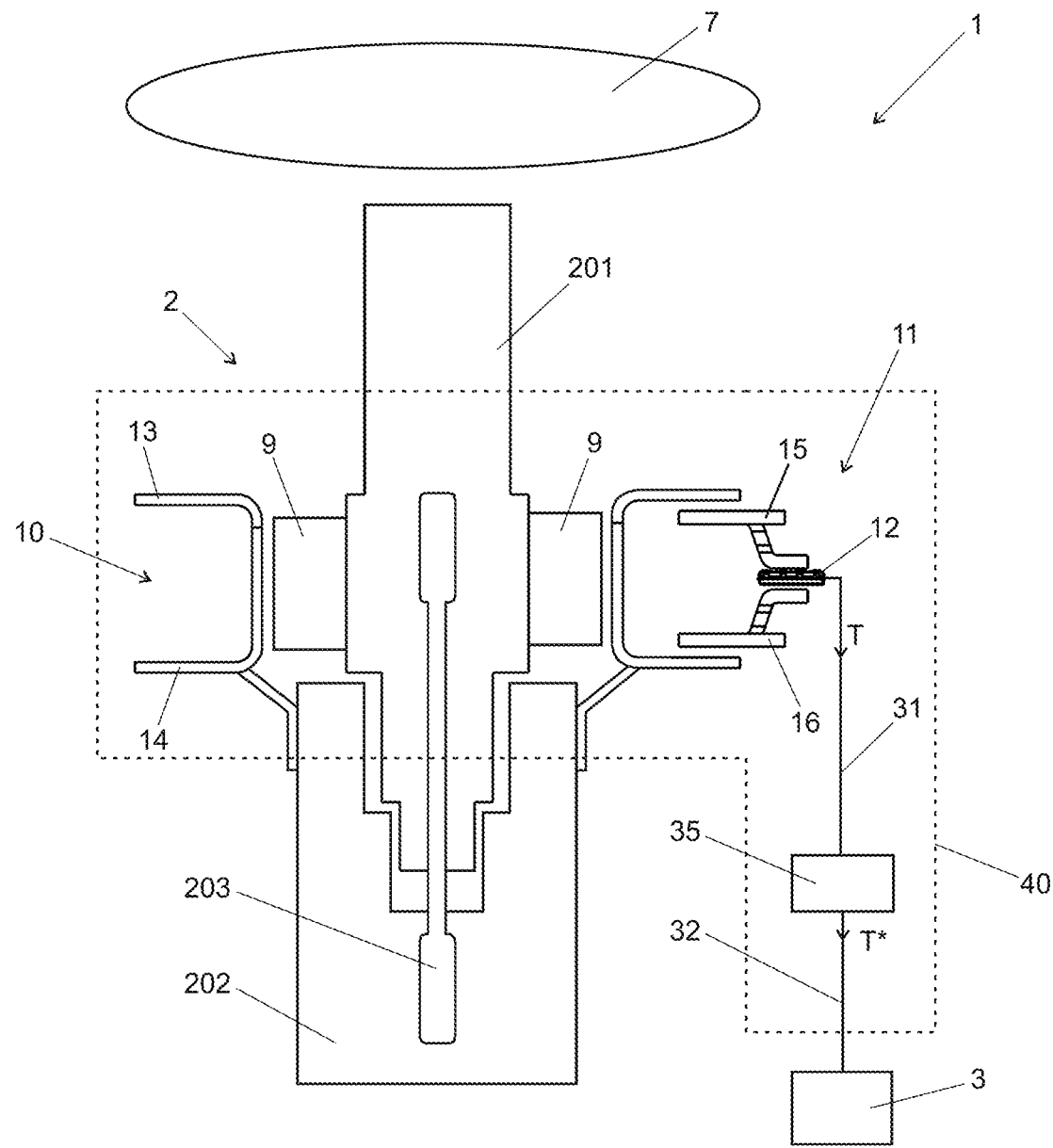
FIG. 3 is a schematic view of a section of a further exemplary embodiment of an electromechanical steering system designed according to the invention of a motor vehicle.

In FIG. 3, a section of an electromechanical steering system 1 is shown schematically, wherein it may be in particular a steering system as explained with reference to FIG. 1. The steering system 1 comprises a steering shaft 2, which comprises an input shaft 201 non-rotatably connected to a steering handling device 7 and an output shaft 202 connected to the input shaft 201 via a torsion bar 203 that can be twisted. Furthermore, the steering system comprises a magnetic torque sensor device 40 for measuring a torque applied to the steering shaft 2. In this exemplary embodiment, the torque sensor device 40 comprises a multi-pole magnetic ring 9 non-rotatably connected to the input shaft 201, in particular as shown in FIG. 2, for generating a magnetic field. Furthermore, the torque sensor device 40 comprises a stator ring element 10 non-rotatably connected to the output shaft 202, enclosing the magnetic ring 9 and having a first stator sub-ring element 13 and a second stator sub-ring element 14, a magnetic flux selector 11 and a sensor 12 for generating a measurement signal T, wherein the corresponding components, in particular the magnetic ring 9, the stator ring element 10, the magnetic flux collector 11 and/or the sensor 12, are advantageously of the form as shown in FIG. 2. In this exemplary embodiment, the sensor 12 is designed to detect the uncompensated measurement signal T based on the magnetic field applied to the magnetic flux collector 11, in particular as a function of a change in the magnitude and/or the direction of the magnetic field strength. The uncompensated measurement signal T is transmitted via a signal line 31 to a computing unit 35 assigned to the torque sensor device 40, in particular a central ECU (ECU: electronic control unit) of the motor vehicle. However, the computing unit 35 may in particular also be a computing unit included in the torque sensor device 40, for example an ASIC. The computing unit 35 is designed to provide a first parameter and a second parameter for compensation of the uncompensated measurement signal T, in particular from a memory unit of the computing unit which is not explicitly shown in FIG. 3, and to determine a compensated measurement signal T* based on the uncompensated measurement signal T and the first parameter and the second parameter. The compensated measurement signal T* is advantageously provided to the steering actuator of the steering system 1, in particular to the steering gear 3, as an input variable. As a result, improved control of the steering controller can advantageously be achieved. In particular, the steering actuator has a control unit which is not explicitly shown in FIG. 3, in particular a proportional controller.

Figure 4:
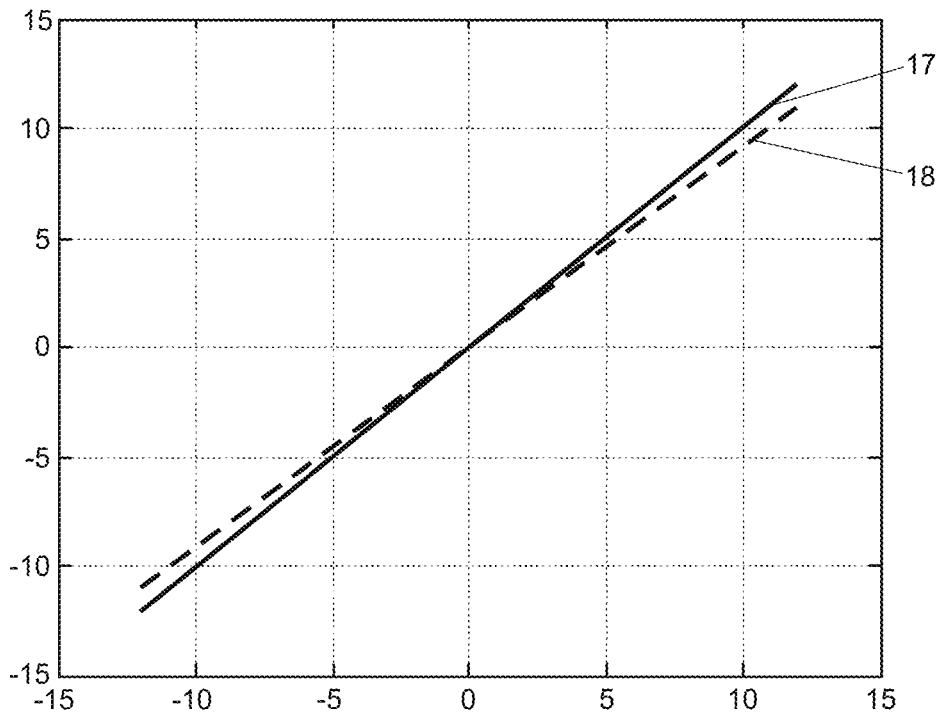
FIG. 4 is a two-dimensional coordinate system in which by way of example values for the detected torque are shown against values for a reference torque.

FIG. 4 shows a two-dimensional coordinate system in which values for the detected torque in Nm (Nm: Newton meters) are displayed on the vertical axis against values for a reference torque in Nm plotted on the horizontal axis.

The idealized curve 17, represented as a solid line, corresponds to the desired curve, namely such that the detected torque corresponds exactly to the reference torque. In contrast, the actual curve 18 shown as a dashed line corresponds to the true, S-shaped curve, namely such that the detected torque deviates from the reference torque. The deviation in the negative reference torque region (in FIG. 4 on the left) and the deviation in the positive reference torque region (in FIG. 4 on the right) are of opposite sign. In other words, in the negative reference torque region, the detected torque deviates "upwards" from the reference torque, and in the positive reference torque region, the detected torque deviates "downwards" from the reference torque.

Figure 5:
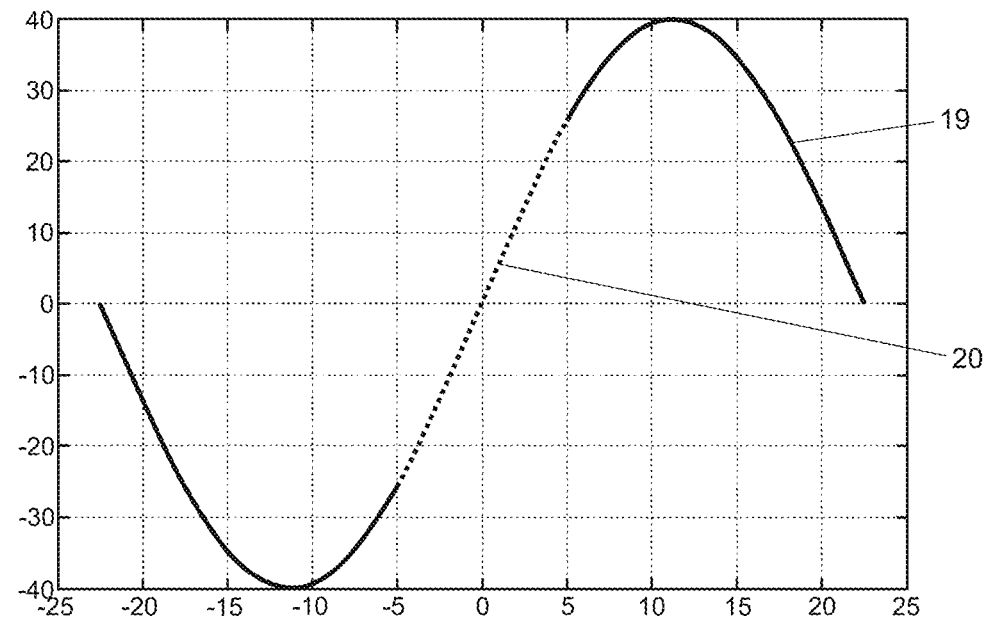
FIG. 5 is a two-dimensional coordinate system in which by way of example values for the magnetic flux density are shown against values for a difference angle.
Figure 6:
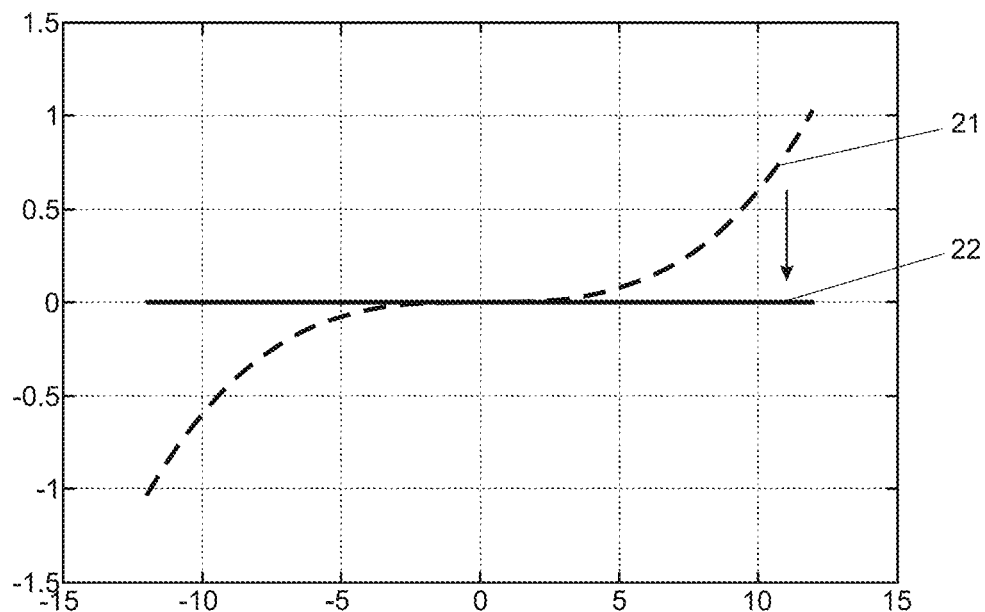
FIG. 6 is a two-dimensional coordinate system in which by way of example values for the measurement error in the detected torque are shown against values for a reference torque.

FIGS. 5 and 6 show the compensation of the measurement signal generated by the sensor of the torque sensor device, namely by linearization.

FIG. 5 shows a two-dimensional coordinate system in which values for the magnetic flux density in mT (mT: millitesla) are represented on the vertical axis against values plotted on the horizontal axis for a difference angle in ° (°: degrees).

The curve 19 is sinusoidal, i.e. considerably nonlinear. In an angular range of about −5° to about +5°, shown as curve section 20, the curve 19 is less significantly nonlinear. The curve section 20 is approximately linear, wherein the curve section 20 has an S-shaped profile. The center of the coordinate system is in the center of the curve section 20. Accordingly, the curve section 20 is symmetrical with respect to the coordinate center.

FIG. 6 shows a two-dimensional coordinate system in which values for the measurement error in the detected torque in Nm are shown on the vertical axis against values plotted on the horizontal axis for a reference torque in Nm.

The uncompensated curve 21 shown as a dashed line corresponds to the profile of the measurement signal T before the compensation of the nonlinearity according to the invention. In contrast, the compensated curve 22 shown as a solid line corresponds to the profile of the measurement signal T* after the compensation of the nonlinearity according to the invention.

The arrow indicates the linearization of the uncompensated curve 21 towards the compensated curve 22.

Figure 7:
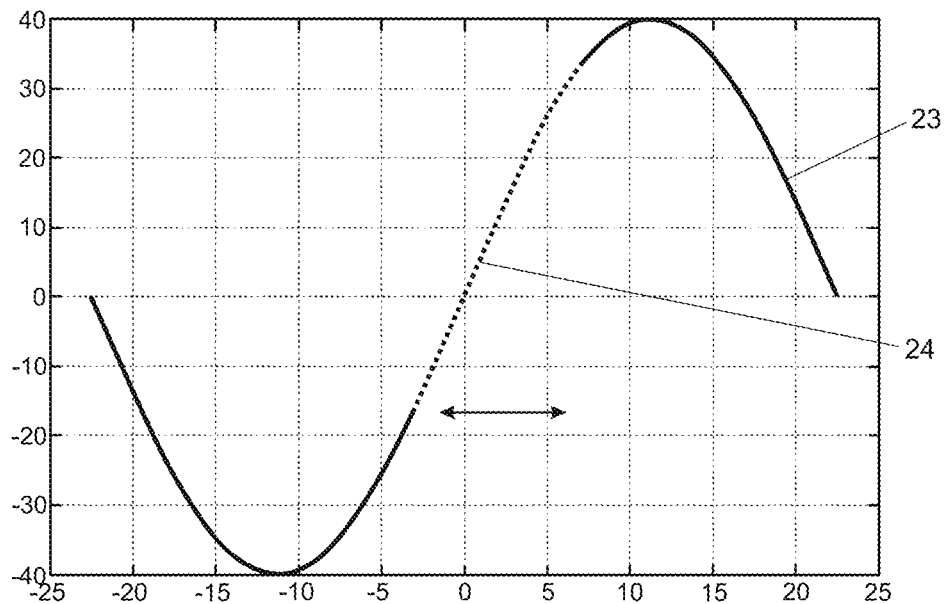
FIG. 7 is a two-dimensional coordinate system in which by way of example values for the magnetic flux density are shown against values for a difference angle, taking into account the assembly tolerance that causes an asymmetry.
Figure 8:
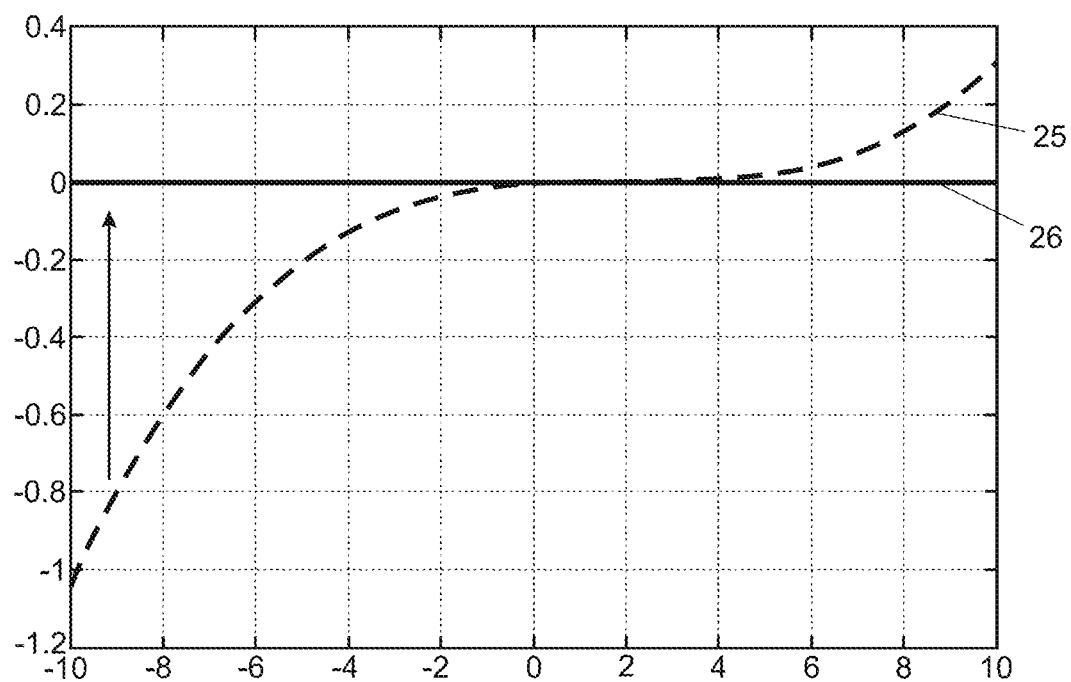
FIG. 8 is a two-dimensional coordinate system in which by way of example values for the measurement error in the detected torque are shown against values for a reference torque, taking into account the assembly tolerance that causes an asymmetry.

FIGS. 7 and 8 show the compensation of the measurement signal generated by the sensor of the torque sensor device, namely by linearization and symmetrization. Signal artifacts of the nonlinearity and the asymmetry overlap here.

FIG. 7 shows a two-dimensional coordinate system in which values for the magnetic flux density in mT are shown on the vertical axis against values plotted on the horizontal axis for a difference angle in ° (degrees).

The curve 23 is sinusoidal, i.e. considerably nonlinear. However, in an angular range of about −5° to about +5°, shown as curve section 24, the curve 23 is less significantly nonlinear. The curve section 24 is approximately linear, wherein curve section 24 has an S-shaped profile. In contrast to the curve 19 from FIG. 5, the center of the coordinate system is not in the middle of the curve section 24, but off-center. The curve section 24 is therefore asymmetrical with respect to the coordinate center. The arrow indicates the asymmetry of the curve section 24.

FIG. 8 shows a two-dimensional coordinate system in which values for the measurement error in the detected torque in Nm are shown on the vertical axis against values plotted on the horizontal axis for a reference torque in Nm.

The uncompensated curve 25 shown as a dashed line corresponds to the profile of the measurement signal T before the compensation of the nonlinearity and the asymmetry according to the invention. In contrast, the compensated curve 26 shown as a solid line corresponds to the profile of the measurement signal T* after the compensation of the nonlinearity and the asymmetry according to the invention. The arrow indicates the linearization of the uncompensated curve 25 towards the compensated curve 26. Compared to the curve 21 from FIG. 6, the center of the coordinate system along the horizontal axis is not in the middle of the plateau of the curve 25, but off-center. The curve 25 is therefore asymmetrical relative to the coordinate center.

What is claimed is:

1. An electromechanical steering system comprising:
    a steering shaft, by means of which a steering command can be specified by means of a steering handling device, wherein the steering shaft includes an input shaft which is non-rotatably connected to the steering handling device and an output shaft connected to the input shaft by a torsion bar that is twistable;
    a steering gear, that converts a steering command into a steering movement of steerable wheels of a motor vehicle, taking into account at least one input variable; and
    a magnetic torque sensor device for measuring a torque applied to the steering shaft, wherein the torque sensor device comprises a sensor for detecting an uncompensated measurement signal (T), wherein the torque sensor device further includes a multi-pole magnetic ring non-rotatably connected to the input shaft for generating a magnetic field, a stator ring element non-rotatably connected to the output shaft and enclosing the magnetic ring, and a magnetic flux collector, wherein the sensor detects the uncompensated measurement signal (T) based on the magnetic field applied to the magnetic flux collector, wherein the torque sensor device is assigned a computing unit, that provides a first parameter (p_lin) and a second parameter (p_symm) for compensation of the uncompensated measurement signal (T) and calculates a compensated measurement signal (T*) based on the uncompensated measurement signal (T) and the first parameter (p_lin) and the second parameter (p_symm) and provides the calculated compensated measurement signal (T*) as the at least one input variable;
    wherein the computing unit provides the first parameter (p_lin) as a linearization parameter for compensation of nonlinear behavior.

2. The electromechanical steering system as claimed in claim 1, wherein the linearization parameter is a design-specific parameter.

3. The electromechanical steering system as claimed in claim 2, wherein the linearization parameter is a third-order polynomial parameter.

4. The electromechanical steering system as claimed in claim 3, wherein the computing unit provides the second parameter (p_lin) as a symmetrization parameter (p_symm) for compensation of asymmetrical behavior of the uncompensated measurement signal (T).

5. The electromechanical steering system as claimed in claim 4, wherein the symmetrization parameter (p_symm) is a component-specific parameter.

6. The electromechanical steering system as claimed in claim 5, wherein the symmetrization parameter (p_symm) is a second-order polynomial parameter.

7. The electromechanical steering system as claimed in claim 4, wherein the computing unit calculates the compensated measurement signal (T*) according to the following calculation formula:

$$T\hat{\ }*=T+T\hat{\ }2*p\_symm+T\hat{\ }3*p\_lin;$$

with
   T*=compensated measurement signal; T=uncompensated measurement signal;
   p_symm=second parameter; p_lin=first parameter.

8. A method for compensation of a measurement signal of a torque sensor device for an electromechanical steering system of a motor vehicle, wherein an input shaft, non-rotatably connected to a steering handling device is connected to an output shaft via a torsion bar that is twistable, and wherein the torque sensor device comprises a multi-pole magnetic ring, non-rotatably connected to the input shaft for generating a magnetic field, a stator ring element, non-rotatably connected to the output shaft and enclosing the magnetic ring, a magnetic flux collector, and a sensor for generating a measurement signal, the method comprising:
    generating an uncompensated measurement signal (T) by the sensor;
    providing a first parameter (p_lin) and a second parameter (p_symm) for compensation of the uncompensated measurement signal (T), wherein the first parameter (p_lin) is a linearization parameter (p_lin) for compensation of nonlinear behavior of the uncompensated measurement signal (T), wherein the linearization parameter (p_lin) is a design-specific parameter; and
    calculating a compensated measurement signal (T*) based on the uncompensated measurement signal (T) and the first parameter (p_lin) and the second parameter (p_symm).

9. The method as claimed in claim 8, wherein the linearization parameter (p_lin) is a third-order polynomial parameter.

10. The method as claimed in claim 9, wherein the second parameter (p_symm) includes the following step:
    providing a symmetrization parameter (p_symm) for compensation of asymmetrical behavior of the uncompensated measurement signal (T), wherein the symmetrization parameter (p_symm) is a component-specific parameter.

11. The method as claimed in claim 10, wherein the symmetrization parameter (p_symm) is a second-order polynomial parameter.

12. The method as claimed in claim 11, wherein the compensated measurement signal (T*) is calculated according to the following calculation formula:

$$T^* = T + T^2 * p\_symm + T^3 * p\_lin;$$

with
T*=compensated measurement signal; T=uncompensated measurement signal;
p_symm=second parameter; p_lin=first parameter.

* * * * *